United States Patent [19]
Summers

[11] Patent Number: 5,479,297
[45] Date of Patent: Dec. 26, 1995

[54] BLIND SIDE ELIMINATING MIRROR ASSEMBLY

[76] Inventor: Leland H. Summers, 800 S. Victor St., Christopher, Ill. 62882

[21] Appl. No.: 348,915

[22] Filed: Nov. 25, 1994

Related U.S. Application Data

[63] Continuation-in-part of Ser. No. 998,558, Dec. 30, 1992, abandoned.

[51] Int. Cl.⁶ ............... G02B 5/08; G02B 7/182; B60R 1/06
[52] U.S. Cl. ............ 359/841; 359/865; 359/872; 359/877
[58] Field of Search .................. 359/841, 850, 359/854, 855, 864, 865, 872, 877

[56] References Cited

U.S. PATENT DOCUMENTS

| | | |
|---|---|---|
| 2,797,287 | 6/1957 | Prutzman . |
| 2,871,761 | 2/1959 | Snyder . |
| 3,146,296 | 8/1964 | Fischer . |
| 3,375,053 | 3/1968 | Ward ........................ 359/864 |
| 3,424,517 | 1/1969 | Budreck . |
| 3,977,774 | 8/1976 | O'Sullivan ................. 359/865 |
| 4,253,738 | 3/1981 | Linkous ..................... 359/855 |
| 4,504,118 | 3/1985 | Harig ........................ 359/865 |
| 4,678,294 | 7/1987 | Van Nostrand ............ 359/864 |
| 4,685,779 | 8/1987 | Gonzalez ................... 359/841 |
| 4,728,180 | 3/1988 | Janowicz ................... 359/841 |
| 4,890,907 | 1/1990 | Vu et al. ................... 359/865 |
| 4,936,670 | 6/1990 | Yoo .......................... 359/877 |
| 4,962,998 | 10/1990 | Iino . |
| 4,998,812 | 3/1991 | Hou .......................... 359/841 |
| 5,052,792 | 10/1991 | McDonough . |
| 5,107,375 | 4/1992 | Fisher . |
| 5,115,352 | 5/1992 | do Espiritu Santo . |

FOREIGN PATENT DOCUMENTS

| | | | |
|---|---|---|---|
| 0145039 | 11/1980 | Japan .................. 359/865 |
| 0004440 | 1/1982 | Japan .................. 359/841 |

*Primary Examiner*—Ricky D. Shafer
*Attorney, Agent, or Firm*—Richard C. Litman

[57] ABSTRACT

The present invention relates to a mirror assembly which may be mounted to a vehicle to facilitate the safe forward and rearward maneuverability of the vehicle. The mirror assembly includes a frame having an open end and having at least one movable surface. A fixed mirror and a movable mirror are mounted within the frame such that an edge of the movable mirror impinges upon the movable surface of the frame. The movable mirror can be automatically controlled via a prime mover to move relative to the fixed mirror, the frame, and the movable surface. The movable surface is biased against an edge of the movable mirror, and is displaced by the movement of the movable mirror so as to afford a clear line of sight through the movable mirror.

18 Claims, 7 Drawing Sheets

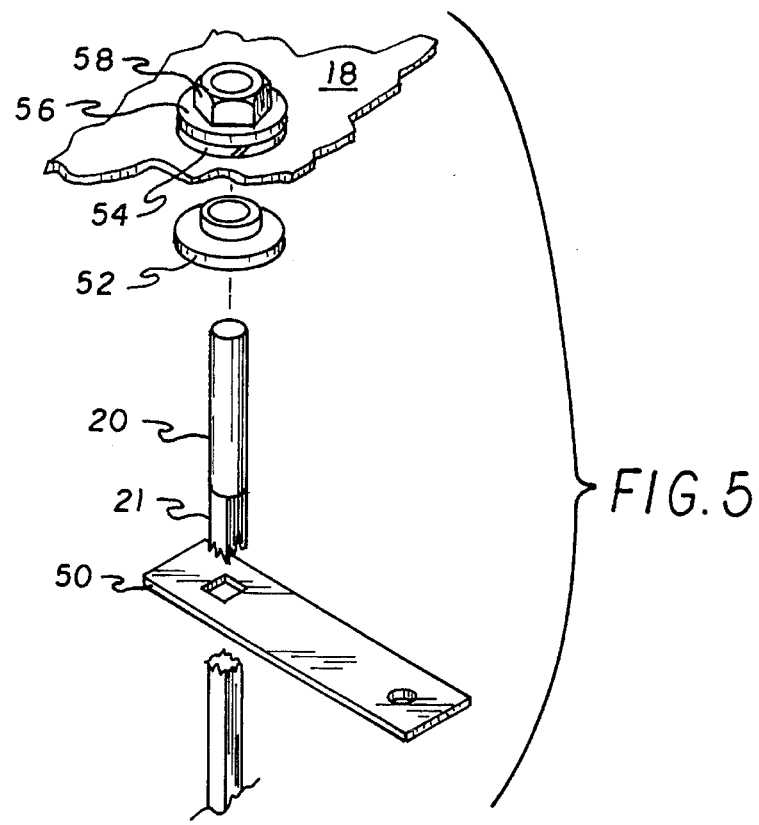
FIG. 5
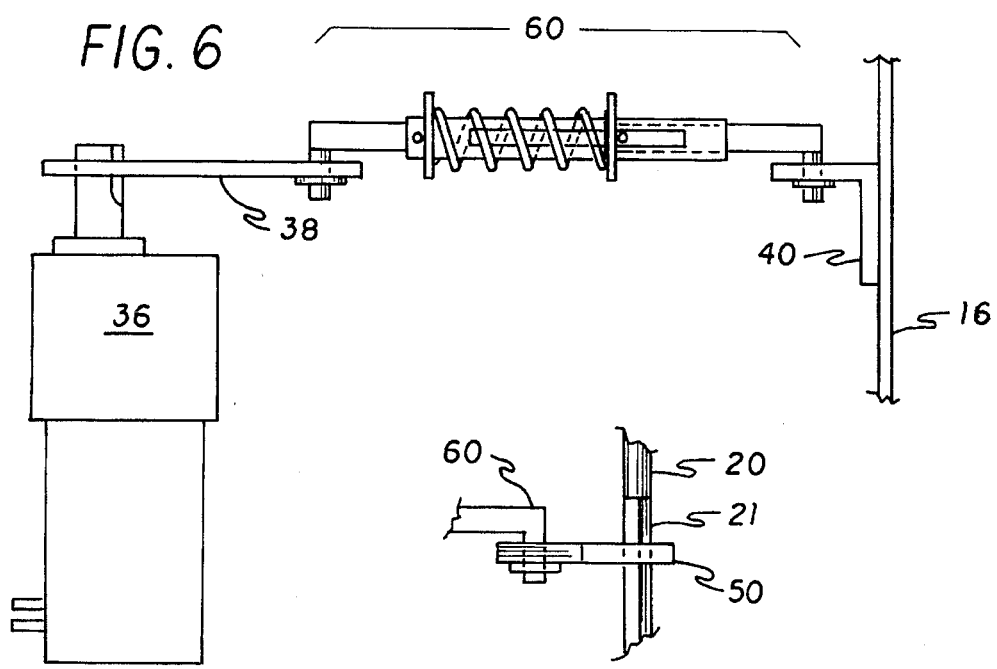
FIG. 6
FIG. 7

BLIND SIDE ELIMINATING MIRROR ASSEMBLY

This is a Continuation-in-Part of Ser. No. 07/998,558, filed Dec. 30, 1992, now abandoned.

BACKGROUND OF THE INVENTION

This invention relates to mirror assemblies, and, more particularly, to a rear view mirror assembly which can be installed on a motor vehicle as new or retrofit equipment. The mirror assembly eliminates the blind side condition, or "blind spot," which occurs as a motor vehicle operator makes various forward and rearward turning maneuvers with a motor vehicle.

DESCRIPTION OF THE PRIOR ART

Of all maneuvers performed by the operator of a motor vehicle, forward and backward turning maneuvers are perhaps the most difficult, and present a great risk of accidental collision. The difficulties of such maneuvers are even greater in large, jointed motor vehicles such as semi tractor-trailer rigs, recreational vehicles (RV's), vehicles towing a trailer, and the like. For brevity and clarity, the specification will hereinafter be limited to an exemplary discussion of the invention in conjunction with a semi tractor-trailer rig. This is for exemplary purposes only, and should not be construed as limiting in any manner.

Many accidents which occur while attempting forward and backward turning maneuvers occur because the driver cannot see where the sides and rear end of the vehicle are going as the vehicle goes through the turn. With conventional rear view mirrors, once the rear of the vehicle passes beyond the outside edge of the mirror, the driver can no longer see the area into which the rear end of the vehicle is travelling. This is especially true where the driver is making a right-hand turn as the tractor-trailer is moving forward or backward. In these situations, once the angle between the tractor and the trailer has reached a critical value, the truck operator can only see the side of the trailer through the passenger side rear-view mirror. The driver can also see directly through the passenger-side window. However, this does not afford the driver a view of the rear end of the trailer. Once the angle between the tractor and trailer has reached the critical point, the driver is presented with a large "blind spot," into which he cannot see.

Even when making left-hand turns, maneuvering is still dangerous. Although the driver can more readily and directly see the area into which the trailer is moving, the driver must constantly shift his gaze from the rear-view mirror (i.e. the driver is looking forward into the rear-view mirror), to craning his head backward to directly view the trailer. This constant motion is very distracting to the task at hand.

Often, when turning either right or left, forward or backward, a turn cannot be completed without the help of an outside observer, or without the operator exiting the vehicle to evaluate the intermediate progress of the turn. Obviously, this significantly lengthens the amount of time needed to successfully accomplish the maneuver. Because many delivery drivers and the like are in a hurry to complete their routes, caution is often thrown to the wind, and the turn is executed without proper patience and care. Many times this results in a collision.

Previous attempts have been made to address the problem of the large blind spot. One such example is U.S. Pat. No. 4,504,118. This reference describes a vehicle mirror assembly having two mirrors each mounted in a separate section of a frame. One mirrored frame section is movable relative to the other frame section. However, any adjustment between the two section must be done manually by the driver. This assembly is actually more cumbersome than a conventional rear-view mirror because the driver must constantly adjust the movable section of the mirror as the backward turn is executed. Moreover, if the mirror assembly is placed on the passenger side of the vehicle, the driver cannot reach it at all. In this instance, the movable mirrored section must be set to a fixed position which maximizes the rearward view of the driver. The mirror setting cannot be changed directly by the driver while backing up.

Another rear view mirror device is shown in U.S. Pat. No. 2,797,287, issued Jun. 25, 1957, to P. E. Prutzman. This reference describes a thermostatically-controlled, heated rear view truck mirror. The heating means help to keep the mirror surfaces clear during inclement weather.

U.S. Pat. No. 2,871,761, issued Feb. 3, 1959, to F. T. Snyder, describes an automobile safety mirror which is designed to be mounted on the hood of an automobile so that the driver can see down the cross street of an intersection before completely entering the intersection. The device includes a double-faced mirror which is pivotally mounted to the hood of a vehicle. When not in use, the mirror is aligned in a neutral position parallel to the direction of travel so as to present a minimal amount of wind resistance and drag. When needed, the mirror can be pivoted along a vertical axis to allow the driver to see in either direction along the cross street.

U.S. Pat. No. 3,146,296, issued Aug. 25, 1964, to K. J. Fischer, describes a rear view mirror assembly having a large planar mirror portion, and a smaller convex mirror portion. U.S. Pat. No. 3,424,517, issued Jan. 28, 1969, to F. Budreck, describes a very similar mirror apparatus. U.S. Pat. No. 5,115,352, issued May 19, 1992, to A. F. do Espiritu Santo, describes yet another mirror assembly having a large planar mirror and a smaller convex mirror, wherein both of the mirrors are adjustable via remote control from inside the cabin of a motor vehicle.

U.S. Pat. No. 4,962,998, issued Oct. 16, 1990, to T. Iino, discloses a "head-up display" (HUD) which projects selected engine performance data onto a display screen located in front of a driver seat.

U.S. Pat. No. 5,052,792, issued Oct. 1, 1991, to M. J. McDonough, describes a rear view mirror device having a fixed mirror, and movable mirror which is responsive to the positioning of the turn signal lever of the motor vehicle. The movable mirror moves between two predetermined positions in response to selective positioning of the turn signal lever.

U.S. Pat. No. 5,107,375, issued Apr. 21, 1992, to J. C. Fisher, discloses a rear view mirror designed for use in a drivers' education vehicle. The mirror is mounted on the passenger side of the vehicle such that an instructor sitting in the passenger seat can clearly see behind the vehicle. A screen in provided which blocks the student's view from the instructor's mirror, while simultaneously allowing the student to clearly see through a conventional rear view mirror.

None of the above references, taken alone, or in any combination, is seen as describing the present mirror assembly.

SUMMARY OF THE INVENTION

Among the several objects of the present invention may be noted the provision of a mirror assembly particularly suited for installation on the passenger side of a motor vehicle to eliminate the dangers encountered when executing turning maneuvers. The mirror assembly may be readily adjusted either manually, or automatically as a forward or rearward turn is performed. This allows a motor vehicle operator to constantly view the area into which the rear and sides of the truck are travelling, thereby eliminating the "blind spot."

It is also an object of the present invention to provide a mirror assembly which does not distract the driver of a truck while turning maneuvers are being made. This allows turns to be made quickly and safely.

Another object of the present invention is to provide a rear view mirror assembly having at least one fixed mirror which provides the driver a constant rearward view, and at least one adjustable mirror which the driver can position (either manually or automatically) as a forward or rearward turn is made.

Yet another object of the present invention is to provide a mirror assembly having an adjustable mirror which is returnable to a starting position, and can be adjusted by an operator without diverting the operator's attention from steering a motor vehicle.

Still another object of the present invention is to provide a mirror assembly which can be installed as original equipment on a motor vehicle, or retrofit onto an existing motor vehicle.

Yet another object of the present invention is to provide a mirror apparatus including a frame having a jointed portion which moves in response to the movement of a movable mirror, thereby providing a greatly increased field of view to the operator of a motor vehicle.

In accordance with the above objects, the present blind-side-eliminating mirror assembly includes a frame having at least one movable surface, and a first fixed mirror fixedly mounted within the frame. A second movable mirror is mounted within the frame adjacent to the first fixed mirror and the movable surface of the frame such that when the movable mirror is adjusted, an edge of the movable mirror will impinge upon the movable surface, and move it out of the operator's line of sight through the movable mirror. In this fashion, the present apparatus provides a much wider field of view to the operator.

Electric motors may be operationally connected to either or both of the fixed and movable motors to facilitate remote adjustment of both the entire mirror assembly relative to the motor vehicle, and the adjustment of the movable mirror relative to the fixed mirror and frame of the assembly.

In a preferred embodiment, the movable mirror is pivotally connected to the fixed mirror via a spring-loaded hinge which urges the fixed mirror into a coplanar orientation with the fixed mirror. In a similar fashion, the movable surface of the frame is movable between a first closed position, and a second extended position, and may be connected to the rest of the frame via a spring-loaded hinge which urges the movable surface toward the closed position.

Other objects and features of the invention will become clear upon a reading of the Detailed Description.

BRIEF DESCRIPTION OF THE DRAWINGS

FIG. 5 is an exploded perspective view of the mounting shaft of the mirror assembly.

FIG. 6 is a side elevational view of a motor and connecting linkage of the mirror assembly.

FIG. 7 is a side elevational view of a connecting linkage.

DETAILED DESCRIPTION OF THE PREFERRED EMBODIMENT

Figure 1A:
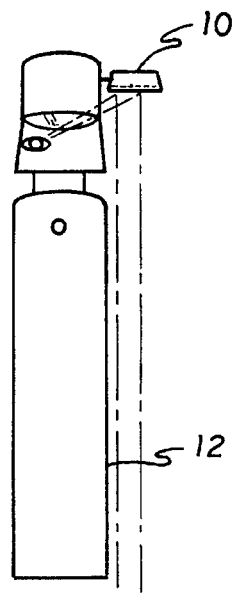
FIG. 1A is a top plan view of a semi-tractor trailer rig prior to the start of a turning maneuver.
Figure 1B:
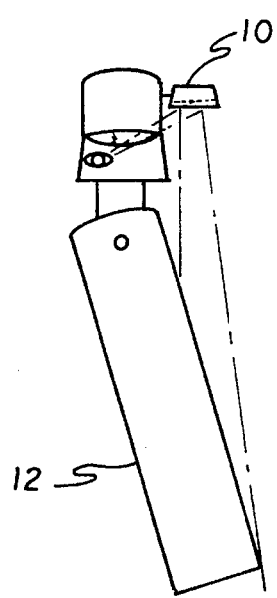
FIG. 1B is a top plan view of a semi-tractor trailer rig at an early stage of a turning maneuver.
Figure 1C:
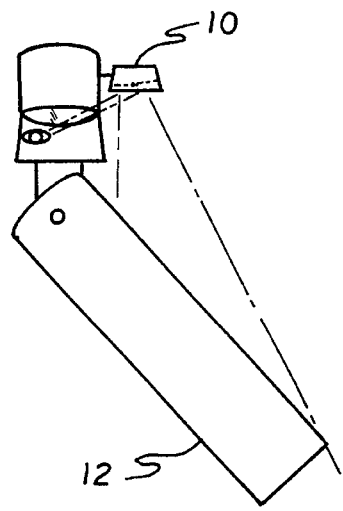
FIG. 1C is a top plan view of a semi-tractor trailer rig near the mid-way point of a turning maneuver.
Figure 1D:
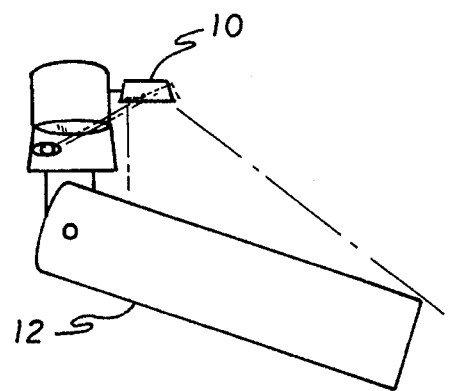
FIG. 1D is a top plan view of a semi-tractor trailer rig at a late stage of a turning maneuver.
Figure 1E:
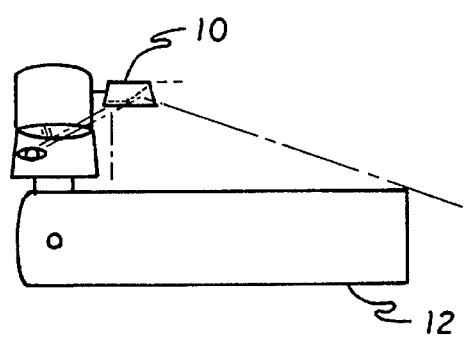
FIG. 1E is a top plan view of a semi-tractor trailer rig at a last stage of a turning maneuver.

Reference is made herein to the attached drawings. Like reference numerals are used throughout the various drawings to depict like or similar elements of the claimed mirror apparatus.

FIGS. 1A through 1E depict a semi tractor-trailer 12 as it progresses through a right-hand turn (either forward or backward). Dotted lines coming from mirror assembly 10 depict the line of sight of an operator of the tractor-trailer as he or she looks through the mirror assembly. As is clearly shown in FIGS. 1C and 1D, once the angle between the tractor and trailer reaches a certain critical angle, a fixed mirror assembly alone would only reflect a view of the side of the trailer to the driver. The present invention, with its dynamically adjustable movable mirror, however, allows the outside portion of the mirror 10 to be manipulated to provide a clear view of the rear of the trailer. An inside portion of the mirror 10 includes a fixed mirror which allows an operator to track the angle between the cab of the motor vehicle and the trailer. As noted above, the present invention is useful on any type of motor vehicle. The tractor-trailer example used here is for illustrative purposes only.

Figure 2A:
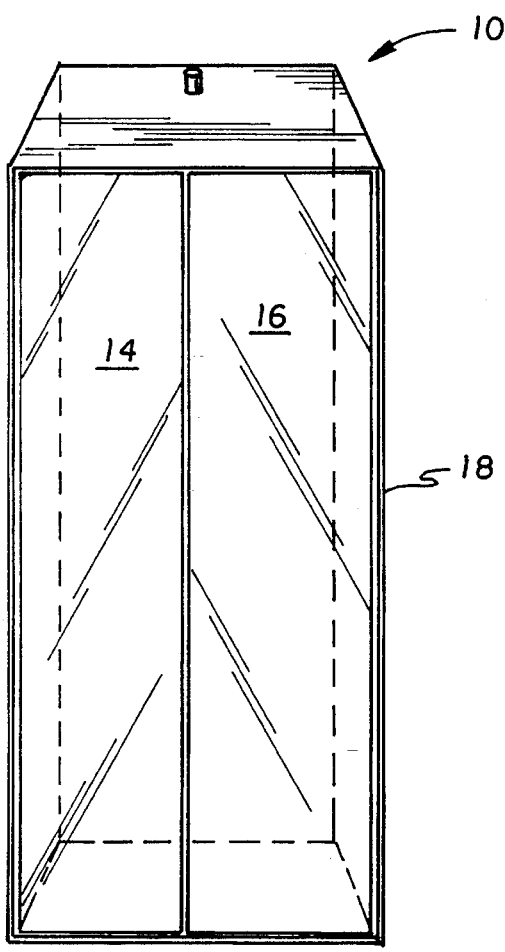
FIG. 2A, 2B, and 2C are perspective views of the present invention in various sizes.
Figure 2C:
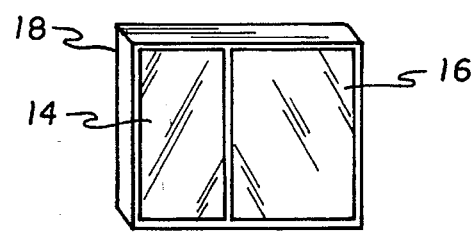
Figure 2B:
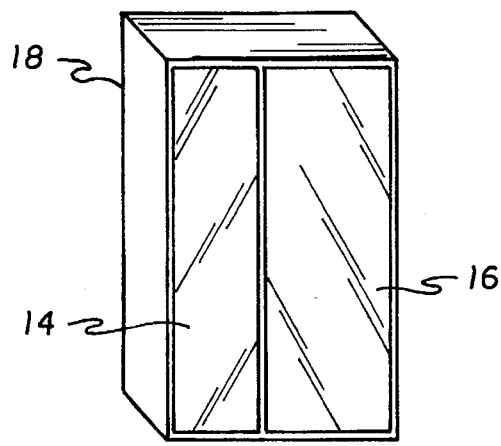

FIGS. 2A through 2C show perspective views of three different sizes of the present invention 10. The mirror assembly 10 includes frame 18, first fixed mirror 14, and second movable mirror 16. The frame 18 has an open end and mirrors 14 and 16 are positioned at the open end of frame 18.

Figure 3:
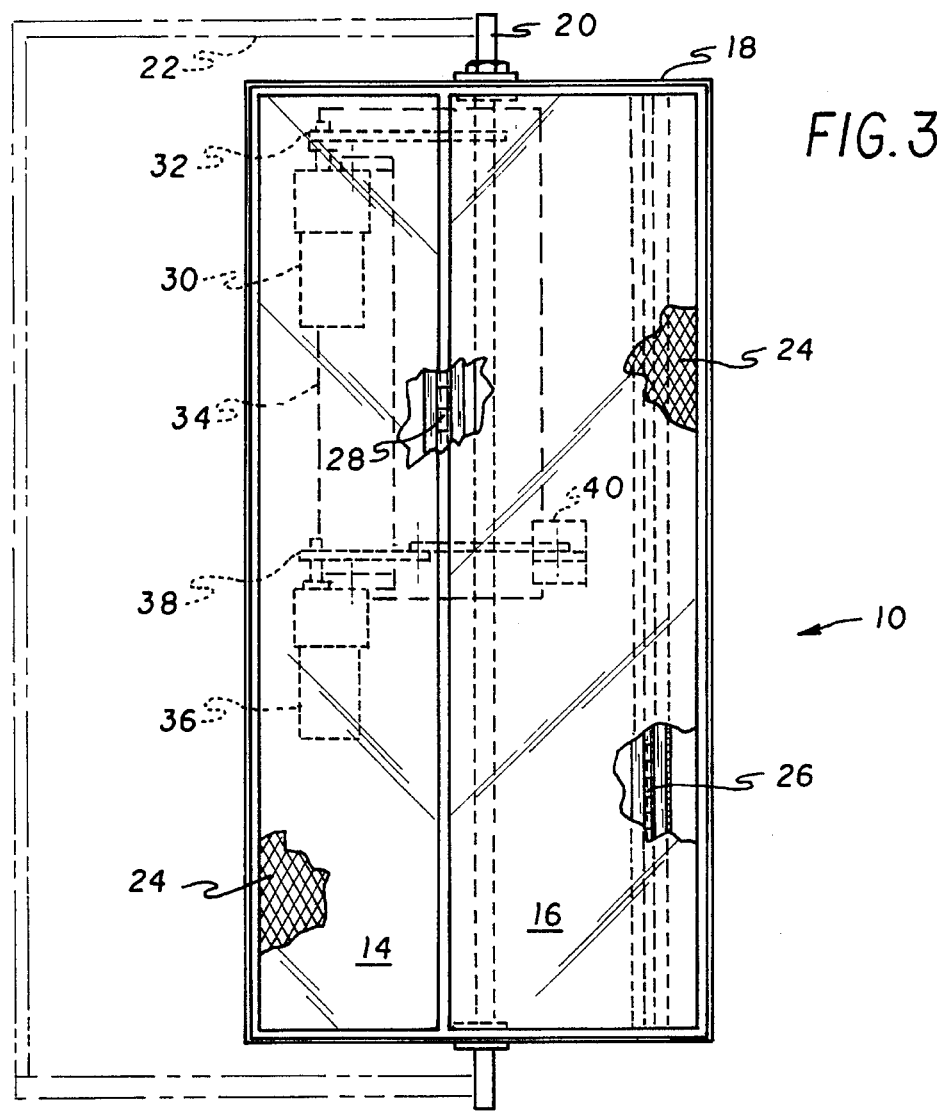
FIG. 3 is a partially cut-away front elevational view of the mirror assembly.
Figure 4:
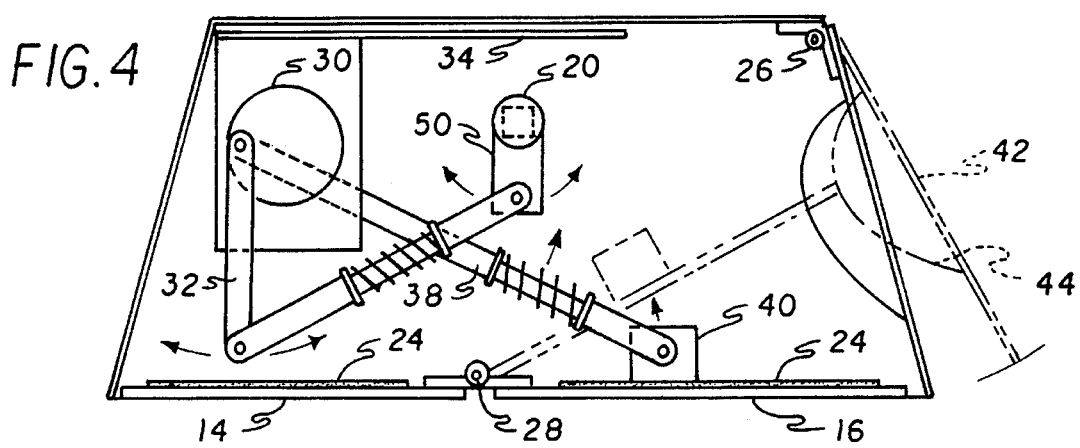
FIG. 4 is a top plan view of the mirror assembly with a top cover removed.

The operation of the present invention will now be given in detail, making reference to FIGS. 3 and 4. The entire mirror assembly 10, is rotationally mounted on mounting shaft 20, and can be mounted to a motor vehicle by mounting bracket 22. Mounting shaft 20 passes through collinear apertures in the top and the bottom of frame 18, respectively. Within the enclosure created by frame 18 is a first motor 30, which is operationally connected to mounting shaft 20 via a connecting linkage 32. The first motor 30 is connected to mounting insert 34, and functions to rotate the entire mirror assembly 10 about mounting shaft 20. Connecting linkage 32 connects to mounting shaft 20 via pivot arm 50.

A second motor 36 may be operationally connected to the back side of movable mirror 16 via connecting linkage 38, and mirror bracket 40. The second motor functions to move movable mirror 16 from a first position with movable mirror 16 disposed at a 180° angle relative to fixed mirror 14, to a second position with the movable mirror disposed at an angle less than 180° relative to the fixed mirror (shown in dotted lines in FIG. 4).

The fixed mirror 14 may be pivotally connected to movable mirror 14 via hinge 28. Hinge 28 may be any type of conventional hinge, including living hinges, or spring loaded hinges to urge movable mirror 16 into the first position relative to the fixed mirror 14. Preferably, hinge 28 is a spring loaded hinge.

Both the fixed mirror and the movable mirror may be heated by heating means 24. Heating means 24 help to keep both mirrors clear during cold weather. The heating means may be any type of conventional heating means, including electrically resistive metal coils, positive temperature coefficient materials, and the like. Electrically resistive metal coils or mats are preferred.

Frame 18 includes a movable surface or portion 42, connected to the rest of frame 18 via hinge 26. A cam surface 44 is disposed upon an interior surface of moveable surface 42. Cam surface 44 cooperates with movable mirror 16 to push surface 42 out of the line of sight through mirror 16 when movable mirror 16 is in the second position. This gives the entire mirror apparatus a much greater field of view than conventional rear view mirror assemblies. When the movable mirror is in the first position, the movable surface 42 is said to be in the closed position. When the movable mirror is in the second position (as shown in dotted lines in FIG. 4), the movable surface 42 is said to be in the extended position.

For ease of manufacturing, both first motor 30 and second motor 36 may be mounted on an insert plate 34. The insert plate is then fixed within the frame 18. This allows for the manufacture of the motors and mounts separate from the manufacture of the frame 18, and greatly eases assembly of the mirror assembly.

FIG. 5 shows an exploded view of mounting bracket 20. The mounting bracket is rotationally fixed to the frame 18 via a bushing 52 on the interior of frame 18, and a spring washer, flat washer, jam nut assembly (54, 56, 58, respectively) on the exterior of frame 18. This is the preferred arrangement. Any suitable rotational mounting means will function with equal success.

Mounting shaft 20 includes a squared portion 21 to matingly engage a squared opening in pivot arm 50. Pivot arm 50 provides the leverage point by which motor 30 rotates the entire mirror assembly 10 about mounting shaft 20.

FIG. 6 depicts the preferred embodiment for operationally linking the motor 36 to the movable mirror 16. This same linkage, with minor modifications as shown in FIG. 7 may also be used to link motor 30 to mounting shaft 20. A connecting linkage 38 is rotationally connected to a spring-dampened connecting piston 60. The piston 60 functions as a shock absorber to cushion the movable mirror 16 from vibrations transferred to the mirror apparatus from the motor vehicle to which it is attached. Piston 60 is then rotationally attached to mirror bracket 40. This arrangement allows for control of mirror 16 using motor 36. An identical arrangement may be used to manipulate the entire mirror assembly about mounting shaft 20, as shown in FIG. 7, with the exception that the piston 60 is attached to pivot arm 50.

Figure 8:
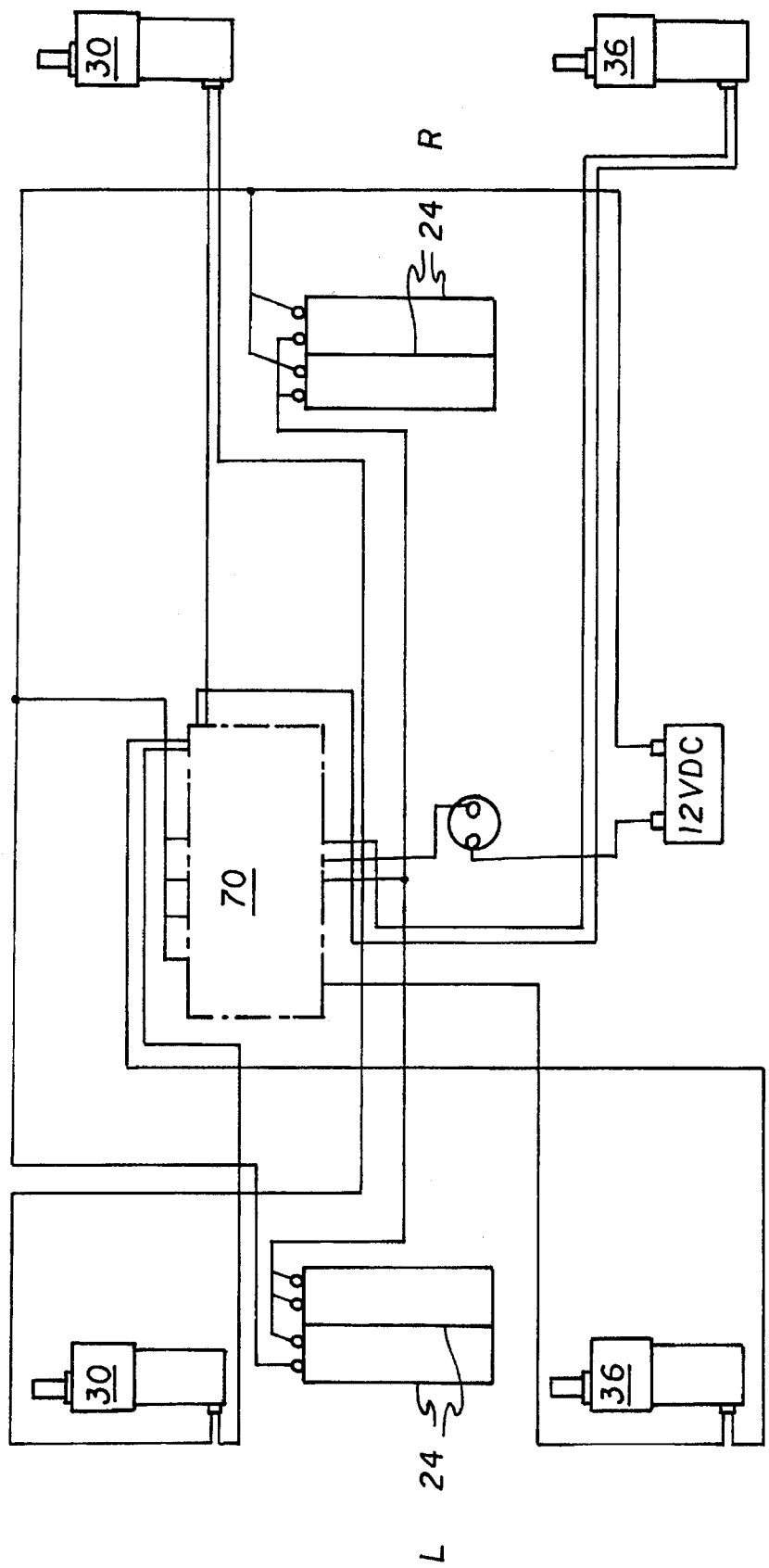
FIG. 8 is wiring schematic of a preferred circuit to automatically control two mirror assemblies according to the present invention, one mounted on the driver's side and another on the passenger's side of a motor vehicle.

To facilitate ease of operation, and to allow an operator to dynamically adjust the relative angles of the entire mirror assembly, and the movable mirror within the mirror frame, it is envisioned that the entire assembly would be remote controllable from within the cab of a motor vehicle. FIG. 8 is a schematic representation of a two mirror assembly having left mirror assembly L, and right mirror assembly R. The mirrors are controlled by circuit board 70 (see FIG. 9, and discussion, below), and are preferably powered by the standard 12 volt DC electrical system found in most motor vehicles. Left and right motors 30 and 36 are shown, along with the two heating means 24 for both left and right mirror assemblies, which may be optionally included.

Figure 9:
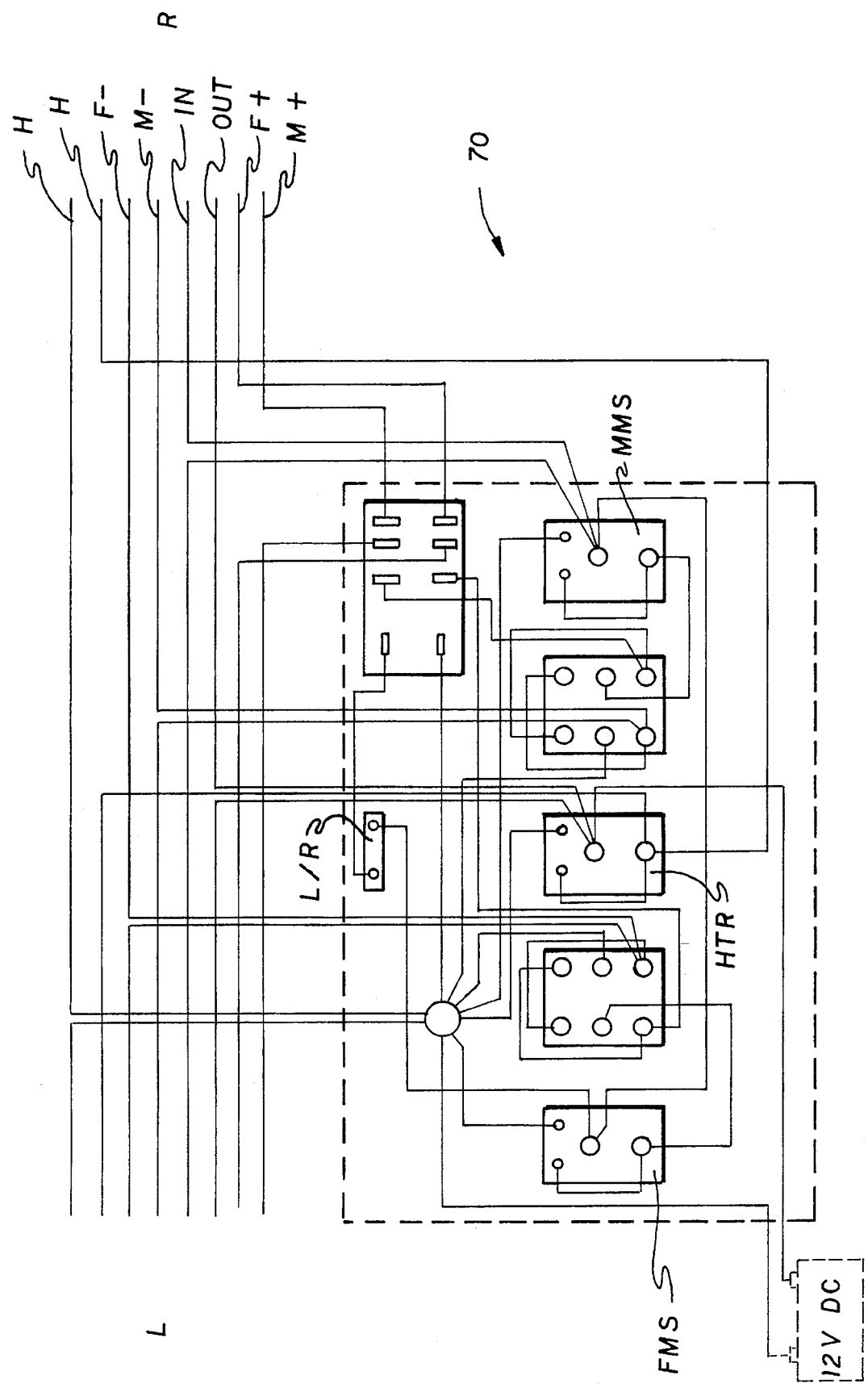
FIG. 9 is a circuit schematic showing a preferred relay and switch arrangement for the automatic control of the two assembly set up depicted in FIG. 8.
Figure 10:
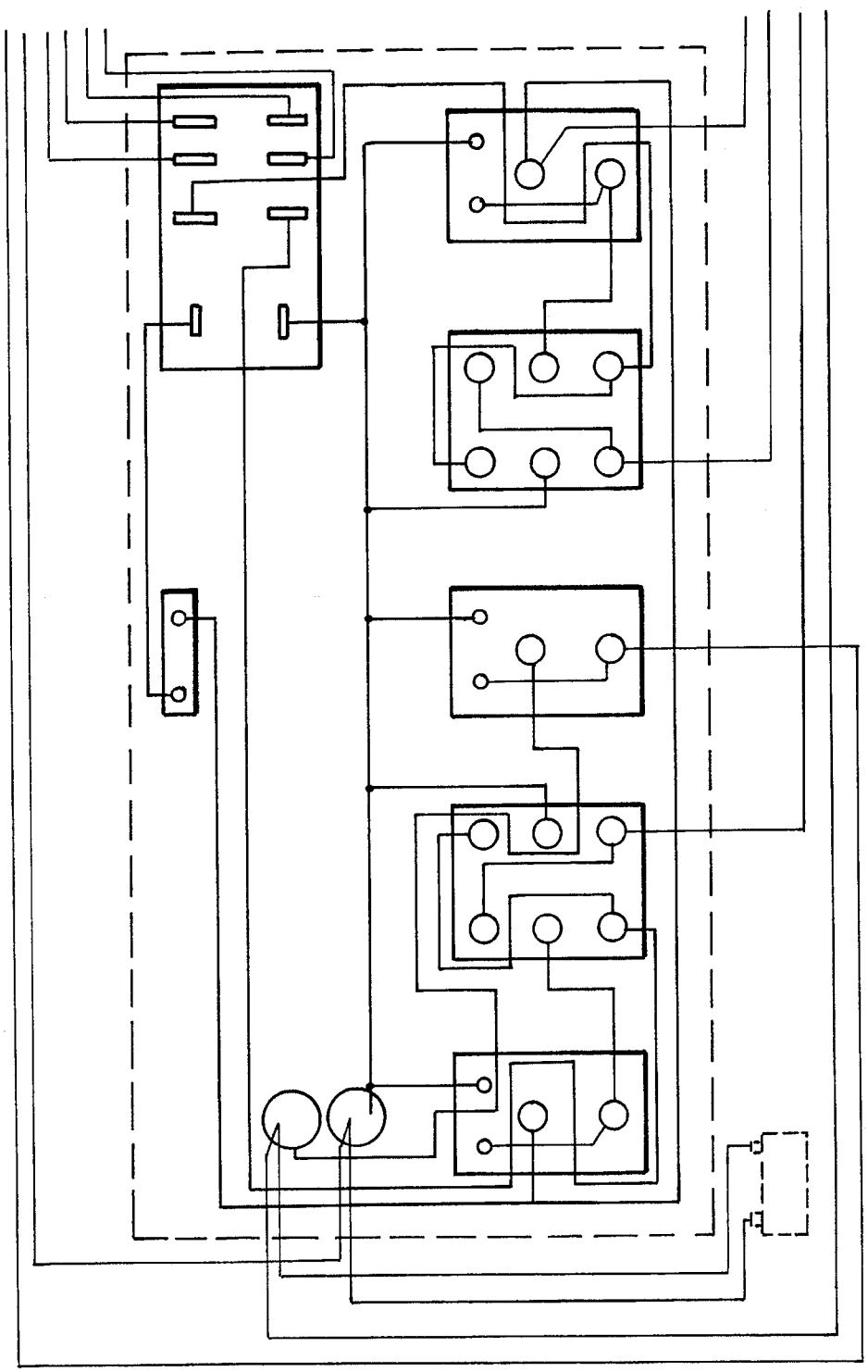

A preferred electrical circuit 70 for controlling a two mirror assembly set up is shown in FIG. 9. For brevity, only the right-hand mirror assembly control circuit R will be described in full. The left-hand control circuit is identical. The circuit includes a single-pole, single-throw switch L/R for selecting current to flow to either the left-hand mirror assembly or the right-hand mirror assembly. Another single-pole, single-throw switch HTR may be included to turn the heating means on and off. The heating control means may also include thermostatic control means (not shown).

Two double-pole, double-throw switches, FMS and MMS, are provided to control the fixed mirror orientation (i.e. the orientation of the entire mirror assembly), and the movable mirror assembly, respectively. The double-pole, double-throw switches allow the mirror frame, and the movable mirror to be rotated in either a clockwise or a counter-clockwise direction. Current flow in response to the various switches is controlled by relays R, which are well known in the art.

The electrical leads, labelled for the right-hand mirror assembly, include two heater leads H, to power the heating means on the fixed and movable mirrors; motor leads F− and M−, to move the entire mirror assembly and the movable mirror in a counterclockwise direction, respectively; and motor leads F+ and M+ to move the entire mirror assembly and movable mirror in the clockwise direction. The leads labelled IN and OUT are for incoming and outgoing current, respectively.

Other types of automatic control means can be easily envisioned without departing from the scope of the present invention.

Using the mirror control means just described, an operator of a motor vehicle can easily and simultaneously control both the operation of the mirror assembly, and the vehicle itself, to quickly and safely execute any number of complex turning maneuvers.

It is to be understood that the present invention is not limited to the embodiments described above, but encompasses any and all embodiments within the scope of the following claims.

I claim:

1. A mirror assembly comprising:
   a frame having an open end and defining an interior volume, said frame including at least one movable surface;
   a first fixed mirror fixedly mounted within said frame adjacent to said open end of said frame;
   a second movable mirror movably mounted within said frame adjacent to said open end of said frame and interposed between said first fixed mirror and said at least one movable surface of said frame, said second movable mirror capable of movement relative to said first fixed mirror, said frame, and said at least one movable surface;

at least one prime mover operationally connected to and capable of moving said second movable mirror; and a cam surface on said at least One movable surface of said frame, said cam surface located within said interior volume defined by said frame, wherein said second movable mirror has a first edge, said first edge being contactable with said cam surface, whereby said at least one movable surface of said frame is moved when said first edge of said second movable mirror is urged against said cam surface to thereby provide an unobstructed view through said second movable mirror.

2. The mirror assembly according to claim 1, wherein said at least one movable surface of said frame is movable between a closed position and an extended position, and further comprising flexible biasing means for urging said at least one movable surface toward said closed position.

3. The mirror assembly according to claim 2, wherein said biasing means is a hinge selected from the group consisting of spring-loaded hinges and living hinges, said hinge operationally connecting said frame and said at least one movable surface.

4. The mirror assembly according to claim 3, wherein said second movable mirror includes a second edge pivotally connected to an edge of said first fixed mirror.

5. The mirror assembly according to claim 4, further comprising heating means for heating said first fixed mirror and said second movable mirror.

6. The mirror assembly according to claim 5, further comprising remote control means for controlling the operation of said at least one prime mover.

7. A motor vehicle rear view mirror assembly comprising:

a frame having an open end and defining an interior volume, said frame including at least one movable surface;

mounting means for mounting said frame to a motor vehicle;

a first fixed mirror fixedly mounted within said frame adjacent to said open end of said frame;

a second movable mirror movably mounted within said frame adjacent to said open end of said frame and interposed between said first fixed mirror and said at least one movable surface of said frame, said second movable mirror capable of movement relative to said first fixed mirror, said frame, and said at least one movable surface;

a first prime mover operationally connected to and capable of moving said second movable mirror, whereby said at least one movable surface of said frame moves to provide an unobstructed view through said second movable mirror;

a mounting bracket movably attached to said frame; and a second prime mover operationally attached to said frame and said mounting bracket, said second prime mover being capable of moving said frame relative to said mounting bracket.

8. The motor vehicle rear view mirror assembly according to claim 7, further comprising remote control means for independently controlling the operation of said first prime mover and said second prime mover.

9. The motor vehicle rear view mirror assembly according to claim 7, further comprising a cam surface on said at least one movable surface of said frame, said cam surface located within said interior volume defined by said frame, wherein said second movable mirror has a first edge, said first edge being contactable with said cam surface, whereby said at least one movable surface of said frame is moved when said first edge of said second movable mirror is urged against said cam surface.

10. The mirror assembly according to claim 9, wherein said at least one movable surface of said frame is movable between a closed position and an extended position, and further comprising flexible biasing means for urging said at least one movable surface toward said closed position.

11. The mirror assembly according to claim 10, wherein said biasing means is a hinge selected from the group consisting of spring-loaded hinges and living hinges, said hinge operationally connecting said frame and said at least one movable surface.

12. The mirror assembly according to claim 11, wherein said second movable mirror includes a second edge pivotally connected to an edge of said first fixed mirror.

13. The mirror assembly according to claim 12, further comprising heating means for heating said first fixed mirror and said second movable mirror.

14. A motor vehicle rear view mirror assembly comprising:

an open-ended frame defining an interior volume and including a top wall and a bottom wall each having a collinear aperture therethrough, a back wall, a fixed inside wall, and a movable outside wall;

a mounting shaft extending through said apertures of said top wall and said bottom wall;

a first fixed mirror fixedly mounted within said frame adjacent to said open end of said frame;

a second movable mirror movably mounted within said frame adjacent to said open end of said frame and interposed between said first fixed mirror and said movable outside wall of said frame, said second movable mirror capable of movement relative to said first fixed mirror, said frame, and said movable outside wall;

a first prime mover operationally connected to and capable of moving said second movable mirror; and a second prime mover operationally connected to said open-ended frame and said mounting shaft and capable of moving said open-ended frame relative to said mounting shaft.

15. The motor vehicle rear view mirror assembly according to claim 14, further comprising a cam located within said interior volume defined by said open-ended frame and permanently fixed to said movable outside wall, wherein said second movable mirror has a first edge, said first edge being contactable with said cam, whereby said movable wall of said frame is moved when said first edge of said second movable mirror is urged against said cam surface.

16. The motor vehicle rear view mirror assembly according to claim 15, Wherein said movable wall of said open-ended frame is movable between a closed position and an extended position, and further comprising flexible biasing means for urging said at least one movable surface toward said closed position.

17. The motor vehicle rear view mirror assembly according to claim 16, wherein said second movable mirror includes a second edge pivotally connected to an edge of said first fixed mirror.

18. The motor vehicle rear view mirror assembly according to claim 17, further comprising heating means for heating said first fixed mirror and said second movable mirror.

* * * * *